United States Patent [19]
Fujii

[11] Patent Number: 5,572,638
[45] Date of Patent: Nov. 5, 1996

[54] IMAGE FORMATION SYSTEM INVALIDATING OUTLINE CORRECTION WITHIN GRADATION IMAGE REGION

[75] Inventor: Shuji Fujii, Tokyo, Japan

[73] Assignee: NEC Corporation, Tokyo, Japan

[21] Appl. No.: 361,570

[22] Filed: Dec. 22, 1994

[30] Foreign Application Priority Data

Dec. 24, 1993 [JP] Japan .................................. 5-347899

[51] Int. Cl.⁶ .................................................. G06T 15/00
[52] U.S. Cl. ............................................ 395/133; 395/135
[58] Field of Search ...................................... 395/133, 135, 395/139, 126–132; 382/199, 266, 269, 274, 275, 299, 300; 358/456–460

[56] References Cited

U.S. PATENT DOCUMENTS 5,410,619   4/1995   Fujisawa et al. .................... 382/199

Primary Examiner—Almis R. Jankus
Attorney, Agent, or Firm—Foley & Lardner

[57] ABSTRACT

In an image formation system, when a halftone region is contained in a raster image data stored in an image memory, the halftone image region is set as a transparent region and the outline correction of the transparent region is made invalid. The image formation system comprises a region set circuit for setting the transparent region in the raster image data, a read-position specifying circuit for specifying a read position of the raster image data that is read out of the image memory, a decision circuit for deciding whether the read position is in the transparent region or not, and a controller for performing an outline-correction control such that the outline correction is performed when the read position of the raster image data is decided not to be in the transparent region, and is not performed when the read position is decided to be in the transparent region.

14 Claims, 5 Drawing Sheets

IMAGE FORMATION SYSTEM INVALIDATING OUTLINE CORRECTION WITHIN GRADATION IMAGE REGION

BACKGROUND OF THE INVENTION

1. Field of the Invention

The present invention relates generally to an image signal control system for raster graphics, and more particularly to an image signal control system provided with an outline smoothing function.

2. Description of the Related Art

In a laser printer in which an electrostatic latent image is formed by exposing and scanning a photosensitive drum or belt while switching a laser beam on and off according to image data, a smoothing operation is widely used to improve the picture quality of a printing image. The smoothing operation is performed by controlling the exposure time of the horizontal scanning direction to correct the outline of the printing image.

A conventional laser printer provided with an outline smoothing function is shown in FIG. 1. In the figure, image data received from a host computer is converted into a printing image data by a raster image processor 51, and the printing image data is stored into an image data memory 52. When the printing image data of one page is stored, the printing image data will be read out from the image memory 52 and transferred as video data VD1 to an outline correction circuit 54 by an image data output circuit 53.

The outline correction circuit 54 has incorporated therein video registers which correspond to several horizontal scanning lines (raster lines). According to the black-and-white arrangement state of surrounding dots of any dot, the outline correction circuit 54 modulates the video data VD1 such that the shape of an outline is more smoothed, and outputs the video data VD2 to a printing mechanism 55. In order to output the video data VD1 in synchronization with the scanning of the laser beam, the printing mechanism 55 supplies a horizontal-scanning synchronization signal HS and a vertical-scanning synchronization signal VS to the image data output circuit 53.

FIGS. 2A and 2B are diagrams used to explain an operation of the outline correction circuit 54. In the figure, reference character VD1 denotes an printing image data stored in the image memory 52, and reference character VD2 denotes video data modulated by the outline correction circuit 54. Assuming that a current scanning dot position is indicated by mark x. Since an outline of the video data VD1 horizontally changes to the right by one-dot step at the next raster line Li+1 of the current raster line Li, the black pattern is extended by ¼ pitch at the previous raster line Li−1 and by ½ pitch at the current raster line Li, and the black pattern is contracted by ¼ pitch at the next raster line Li+1. According to the video data VD2 outline-corrected in this way, a laser of the printing mechanism 55 is driven, an electrostatic latent image is formed on the photosensitive drum, and printing is executed by a known electrophotographic process.

However, since an image processing system of such a conventional laser printer is designed such that the outline smoothing function operates at all times, the outline correction is operated even to gradation data based on a dither method, for instance. As a result, a black printing pattern is modulated. Therefore, there was the drawback that density distribution differs from an original gradation image and the printing image quality is deteriorated.

SUMMARY OF THE INVENTION

Accordingly, it is an object of the present invention to provide an image formation system which is capable of effectively preventing a deterioration in picture quality of a printing image containing a half-tone image.

In the image formation according to the present invention, when a halftone region whose pattern of dots should not be outline-corrected is contained in a raster image stored in an image memory, the halftone image region is set as a transparent region and the outline correction of the transparent region is made invalid.

An image formation system according to the present invention comprises a region set circuit for setting as a transparent region a region comprising a gradation image data in the raster image data, a read-position specifying circuit for specifying a read position of the raster image data that is read out of the image memory, a decision circuit for deciding whether the read position is in the transparent region or not, and a controller for performing an outline-correction control such that the outline correction is not performed only when the read position of the raster image data is decided to be in the transparent region.

The region set circuit preferably generates horizontal coordinate data indicative of start positions and end positions of the transparent region in the horizontal scanning direction and also vertical coordinate data indicative of start positions and end positions of the transparent region in the vertical scanning direction, based on outline coordinate data of the raster image data. The horizontal coordinate data and the vertical coordinate data are stored in a coordinate stack memory and are read out from the coordinate stack memory in accordance with movement of the read position of the raster image data in the vertical scanning direction.

Preferably, the controller is comprised of a outline-correction circuit for correcting the raster image data by modulating the raster image data in the horizontal scanning direction, and a selector for selecting one of the raster image data and the outline-corrected raster image data depending on whether the read position of the raster image data is in the transparent region or not.

BRIEF DESCRIPTION OF THE DRAWINGS

The above and other objects and advantages will become apparent from the following detailed description when read in conjunction with the accompanying drawings wherein.

DETAILED DESCRIPTION OF THE PREFERRED EMBODIMENTS

Figure 1:
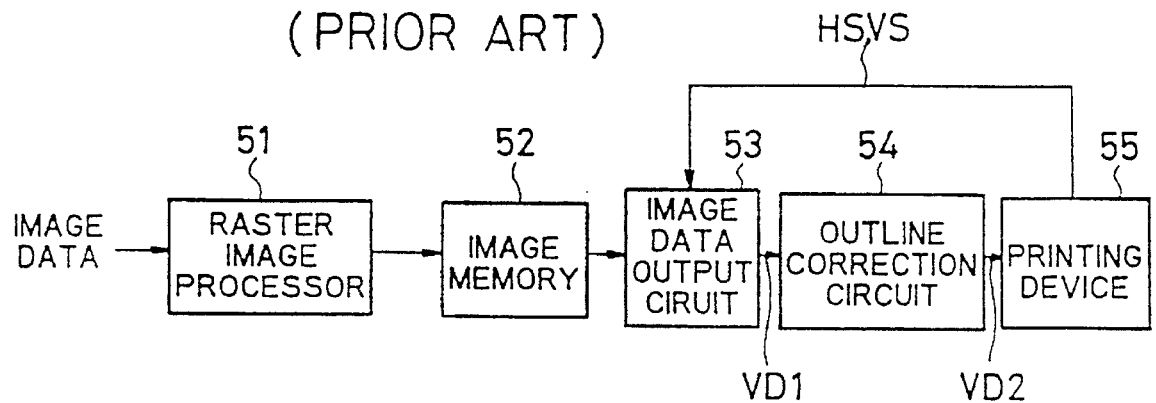
FIG. 1 is a block diagram showing the outline correction system in a conventional laser printer.
Figure 3:
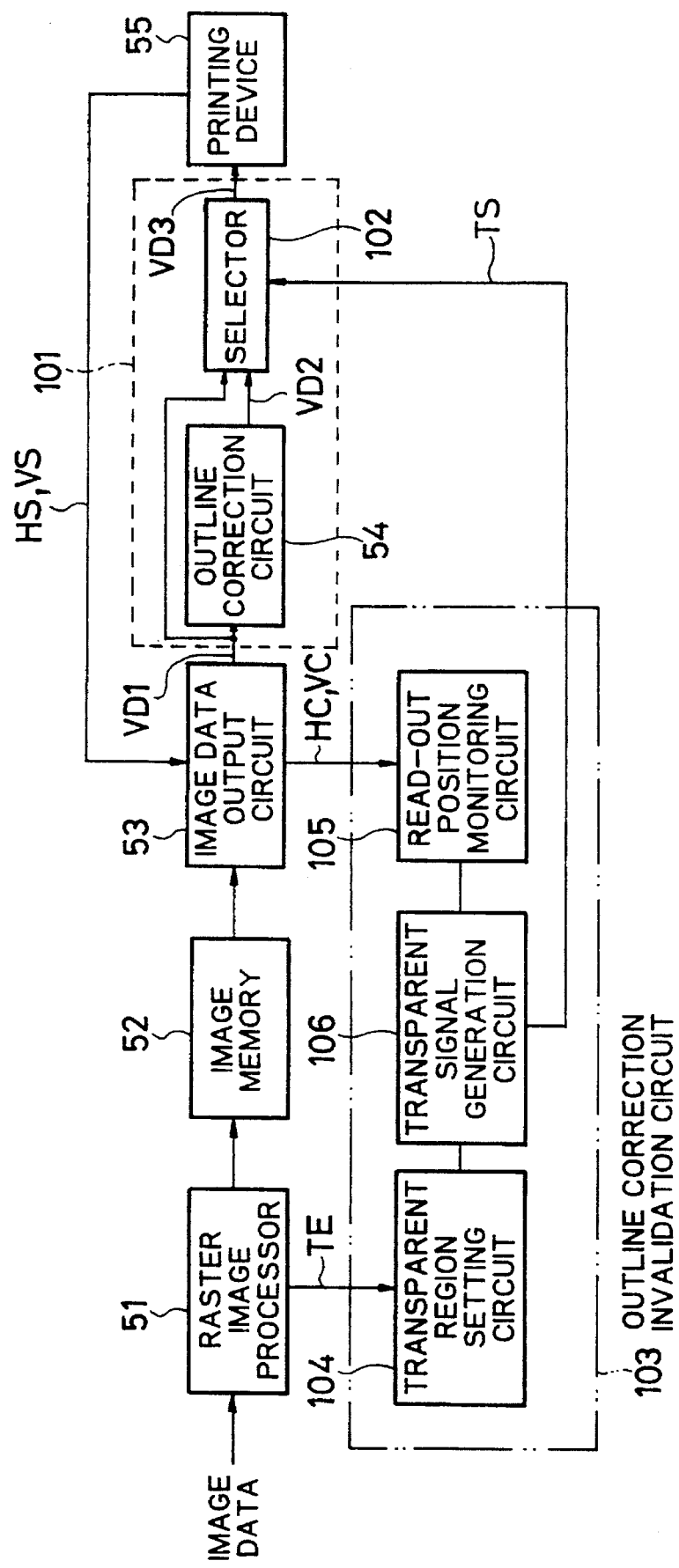
FIG. 3 is a block diagram showing an embodiment of a printer construction accordance with the present invention.

Referring now in greater detail to the drawings and initially to FIG. 3, there is shown a preferred embodiment of an image formation system in accordance with the present invention. The same reference numerals will be applied to the parts of the embodiment of FIG. 3 identical with corresponding parts of FIG. 1.

In FIG. 3, receiving image data from a host computer, a raster image processor 51 converts it into a raster image pattern equivalent to a printing image in pages and outputs the printing image data to an image memory 52. When raster processing of a page is completed, an image data output circuit 53 reads the printing image data as video data VD1 out of the image memory 52 and outputs it to an outline processing circuit 101.

Figure 2A:
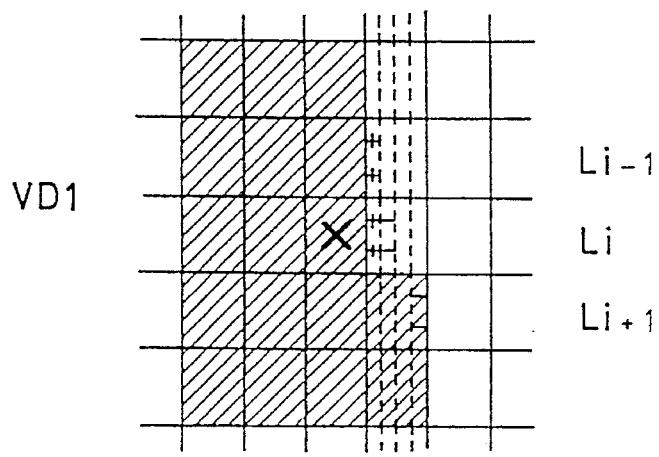
FIGS. 2A and 2B are enlarged diagrams showing a difference between the video data before the outline correction and the video data after the outline correction in the conventional laser printer.
Figure 2B:
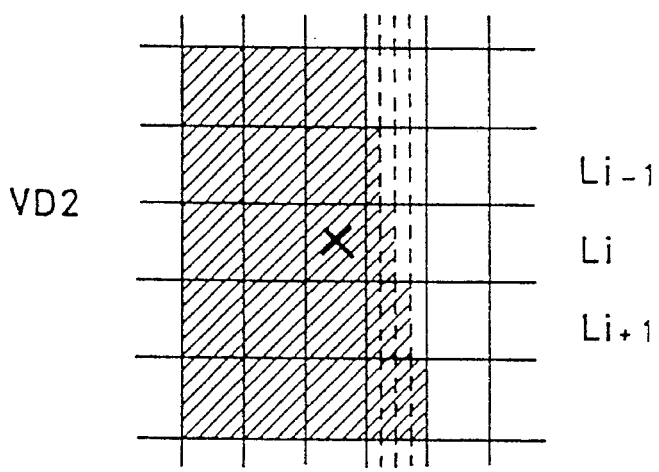

The outline processing circuit 101 functionally comprises an outline correction circuit 54 and a selector 102. The outline correction circuit 54 modulates the video data VD1 so that the shape of the outline becomes smooth and outputs video data VD2, as described in FIGS. 1 and 2A and 2B. The selector 102 is a switch for prohibiting the outline correction of the video data VD1 and, according to a transparent control signal TS, selects either the video data VD1 or the outline-corrected video data VD2 modulated by the outline correction circuit 54. In this embodiment, the selector 102 selects the video data VD1 when the transparent control signal TS is of a logical high level '1' and selects the video data VD2 when the signal TS is of a logical low level '0'.

According to video data VD3 output by the selector 102, a printing mechanism 55 modulates a laser beam and forms an electrostatic latent image by exposing and scanning a photosensitive drum, and performs printing by an electrophotographic process. In order to output the video data VD1 in synchronization with the scanning of the laser beam, the printing mechanism 55 supplies a horizontal-scanning synchronization signal HS and a vertical-scanning synchronization signal VS to the image data output circuit 53. The image data output circuit 53 reads the printing image data from the image memory 52 according to a horizontal-scanning synchronization pulse HC and a vertical-scanning synchronization pulse VC respectively synchronized with the horizontal-scanning synchronization signal HS and the vertical-scanning synchronization signal VS.

Outline-correction invalidation circuit

The transparent control signal TS that is supplied to the selector 102 is generated by an outline-correction invalidation circuit 103. The outline-correction invalidation circuit 103 comprises a transparent region setting circuit 104, a read-position monitoring circuit 105, and a transparent signal generation circuit 106. The transparent region setting circuit 104 presets an outline-correction prohibition region (or a transparent region) based on outline coordinate data TE received from the raster image processor 51. The read-position monitoring circuit 105 monitors a printing image read position, based on the horizontal-scanning synchronization pulse HC and vertical-scanning synchronization pulse VC received from the image data output circuit 53. The transparent signal generation circuit 106 decides whether the read position is in the transparent region, and generates the transparent signal TS.

Transparent region setting circuit

Figure 4:
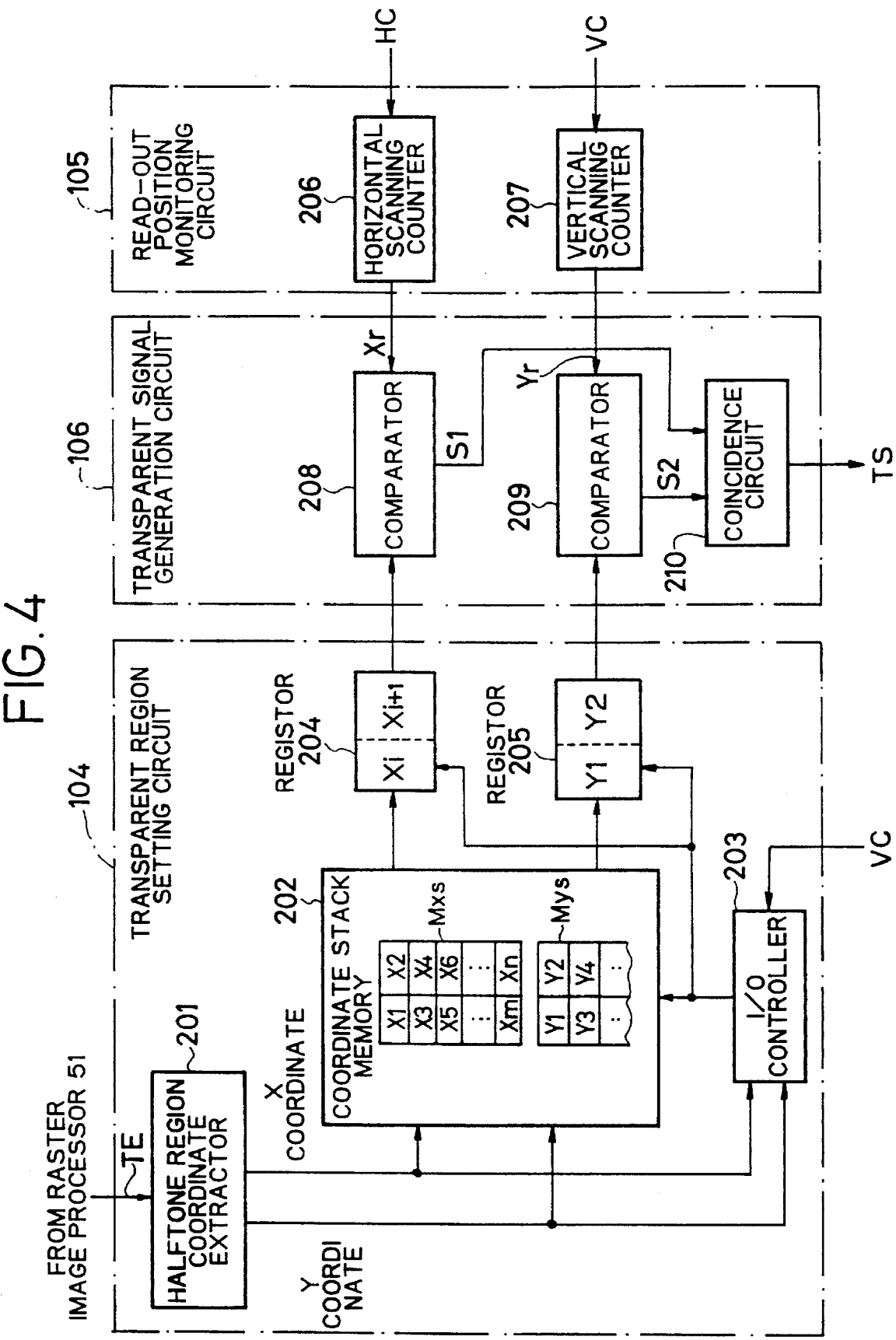
FIG. 4 is a detail block diagram of an outline-correction invalidation circuit in the embodiment of FIG. 3.

FIG. 4 shows a detail circuit configuration of the outline-correction invalidation circuit 103. The transparent region setting circuit 104 is comprised of a halftone region coordinate extractor 201, a coordinate stack memory 202, I/O (input/output) controller 203, and registers 204 and 205. The halftone region coordinate extractor 201 receives the outline coordinate data TE of a printing image and a control signal indicating a halftone region included in the printing image from the raster image processor 51. If the printing image includes at least a halftone image, the halftone region coordinate extractor 201 extracts the start and end points in the horizontal scanning direction of the halftone region in the printing image, as the X coordinates of the transparent region, and also extracts the start and end points in the vertical scanning direction of the halftone region, as the Y coordinates of the transparent region. The coordinate stack memory 202 is comprised of an X-coordinate stack Mxs in which the above-described X coordinates of the start and end points of the transparent region are stored for each raster line and a Y-coordinate stack Mys in which the above-described Y coordinates of the start and end points of the transparent region are stored.

The I/O controller 203 receives the above-described X coordinates and Y coordinates of the transparent region from the halftone coordinate extractor 201 and also the vertical-scanning synchronization pulse VC from the image data output circuit 53. If the count value of the vertical-scanning synchronization pulse VC become equal to the above-described y coordinate of the start point, the I/O controller 203 will read the leading X coordinates and the leading Y coordinate from the X-coordinate stack Mxs and the Y-coordinate stack Mys, respectively, and store them in registers 204 and 205. During the time the count value of the vertical-scanning synchronization pulse VC is between the Y coordinate of the start point and the Y coordinate of the end point, the I/O controller 203 reads the X coordinates of the transparent region in sequence from the X-coordinate stack Mxs according to the vertical-scanning synchronization pulse VC and stores it in the X-coordinate register 204.

Read-position monitoring circuit

The read-position monitoring circuit 105 is comprised of a horizontal scanning counter 206 and a vertical scanning counter 207. The horizontal scanning counter 206 increments its count value according to the horizontal-scanning synchronization pulse HC. Likewise, the vertical scanning counter 207 increments its count value according to the vertical-scanning synchronization pulse VC. Therefore, the current read coordinates of the image memory 52 are specified by the horizontal scanning counter 206 and the vertical scanning counter 207.

Transparent signal generation circuit

The transparent signal generation circuit 106 is comprised of a first comparator 208 for comparing X coordinates, a second comparator 209 for comparing Y coordinates, and a coincidence circuit 210 for performing a logical AND function on the output signals S1 and S2 of the comparators 208 and 209. The first comparator 208 compares the X coordinates of the start and end points (Xi, Xi+1) stored in the X coordinate register 204 with the current read coordinate Xr (X coordinate) received from the horizontal scanning counter 206, and makes the output signal 1 of a logical high level '1' when Xr is not smaller than Xi and not greater than Xi+1 and of a logical low level '0' when Xr is not between Xi and Xi+1 included. Likewise, the second comparator 209 compares the Y coordinates of the start and end points (Yi, Yi+1) stored in the Y coordinate register 205 with the current read coordinate Yr (Y coordinate) received from the vertical scanning counter 207, and makes the output signal S2 of a logical high level '1' when Yr is not smaller than Yi and not greater than Yi+1 and of a logical low level '0' when Yr is not between Yi and Yi+1 included. Therefore, the transparent control signal TS that is output by the coincidence circuit 210 goes to a logical high level only when the read coordinates of the printing image data is within the transparent region.

As described above, when the transparent control signal TS is at a logical high level, the selector 102 selects the video data VD1. Therefore, when the printing image data of the transparent region, i.e., the halftone region is being read out of the image data memory 52, the video data VD1 that has not been outline-corrected is output to the printing mechanism 55.

Operation

The operation of this embodiment will hereinafter be described in detail with reference to FIGS. 5 through 7.

Figure 5:
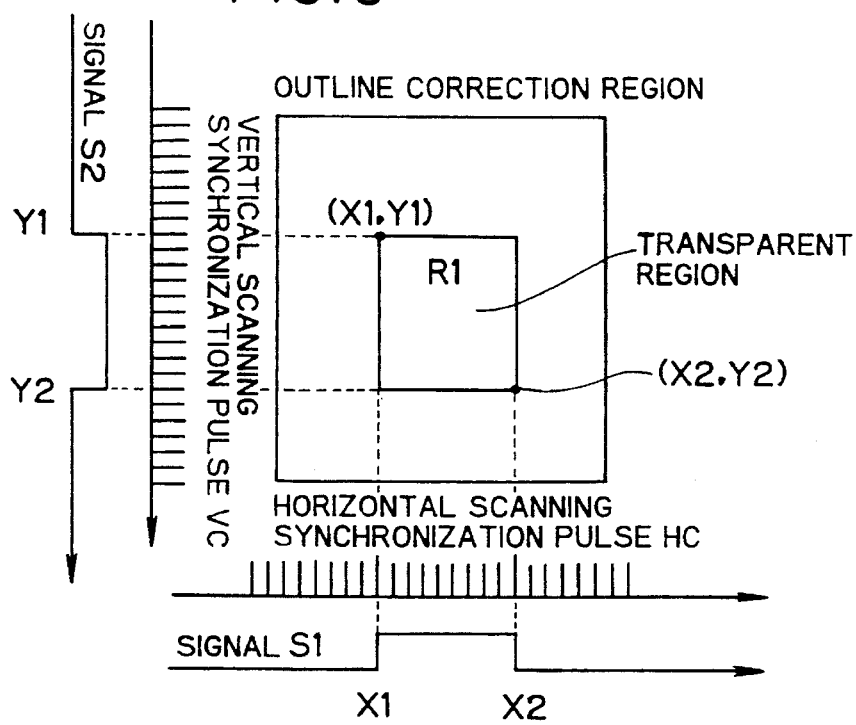
FIG. 5 is a diagram showing a first example of a transparent region formed by the embodiment.

As shown in FIG. 5, it is assumed that a rectangular halftone region exists within a printing image and its diagonal coordinates are (X1, Y1) and (X2, Y2). In this case, the X coordinates (X1, X2) and the Y coordinates (Y1, Y2) extracted by the halftone region coordinate extractor 201 are stored in the X coordinate stack Mxs and the Y coordinate stack Mys of the coordinate stack memory 202, respectively. If the count value of the vertical-scanning synchronization pulse VC becomes equal to Y1 (start point) of the Y coordinates (Y1, Y2), the I/O controller 203 will read out the X coordinates (X1, X2) and the Y coordinates (Y1, Y2) and respectively output them to the X coordinate register 202 and the Y coordinate register 205. At this time, since the vertical scanning counter 207 has reached Y1 (start point), the output signal S2 of the first comparator 208 goes high. Also, if the horizontal scanning counter 206 reaches X1 (start point) of the X coordinates (X1, X2) by the horizontal-scanning synchronization pulse HC, the output signal S1 of the first comparator 208 will go high, and if the counter 206 reaches X2 (end point), the signal S1 will go low. Therefore, the transparent control signal TS which is the output of the coincidence circuit 210 goes to a logical high level only when, as shown in FIG. 5, the read position of the printing image data is within the rectangular transparent region. That is, the outline correction is performed not in the transparent region and the outline correction is performed in the region other than the transparent region.

Figure 6:
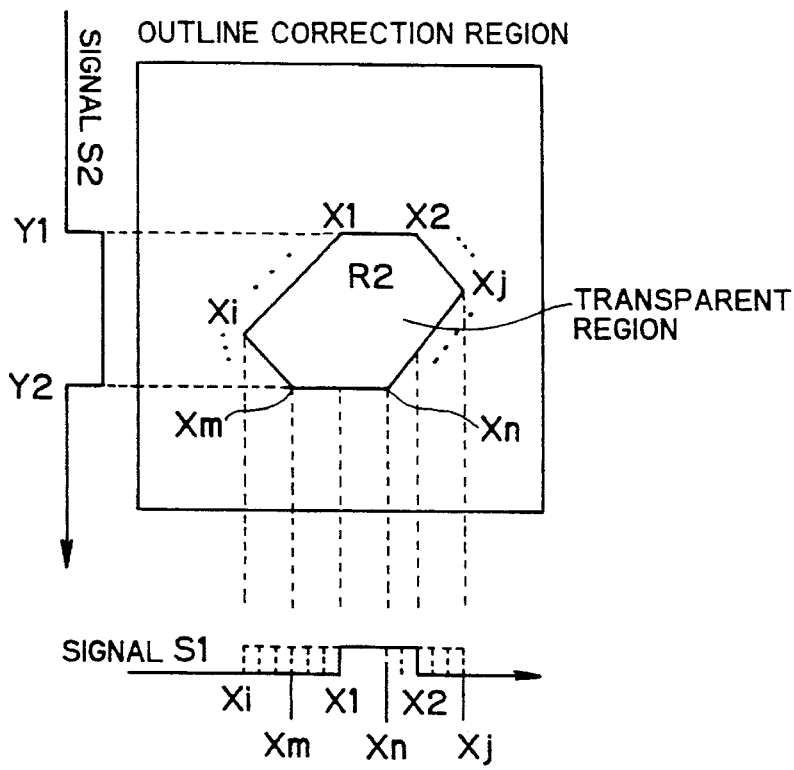
FIG. 6 is a diagram showing a second example of the transparent region formed by the embodiment.

FIG. 6 shows a case where the transparent region has a shape other than a rectangle. In this case, the X coordinates of the start and end points of that transparent region are stored in the X coordinate stack Mxs for each raster line. More particularly, (X1, X2), (X3, X4), . . . , and (Xm, Xn) are stored in the X coordinate stack Mxs, and only (Y1, Y2) is stored in the Y coordinate stack Mys. If the count value of the vertical-scanning synchronization signal VC become equal to Y1, the I/O controller 203 will read the X coordinates (X1, X2) from the X coordinate stack Mxs and the Y coordinates (Y1, Y2) from the Y coordinate stack Mys, and they will be stored in the registers 204 and 205. Subsequently, (X3, X4), . . . , and (Xm, Xn) are read out from the X coordinate stack Mxs synchronizing with the vertical-scanning synchronization signal VC and the content of the register 204 is updated each time. Thus, by storing the X coordinates of the start and end points in the X coordinate stack Mxs for each raster line, not only a transparent region of a rectangular shape such as that shown in FIG. 5 but also a transparent region of a complicated shape such as that shown in FIG. 6 can be set.

Figure 7:
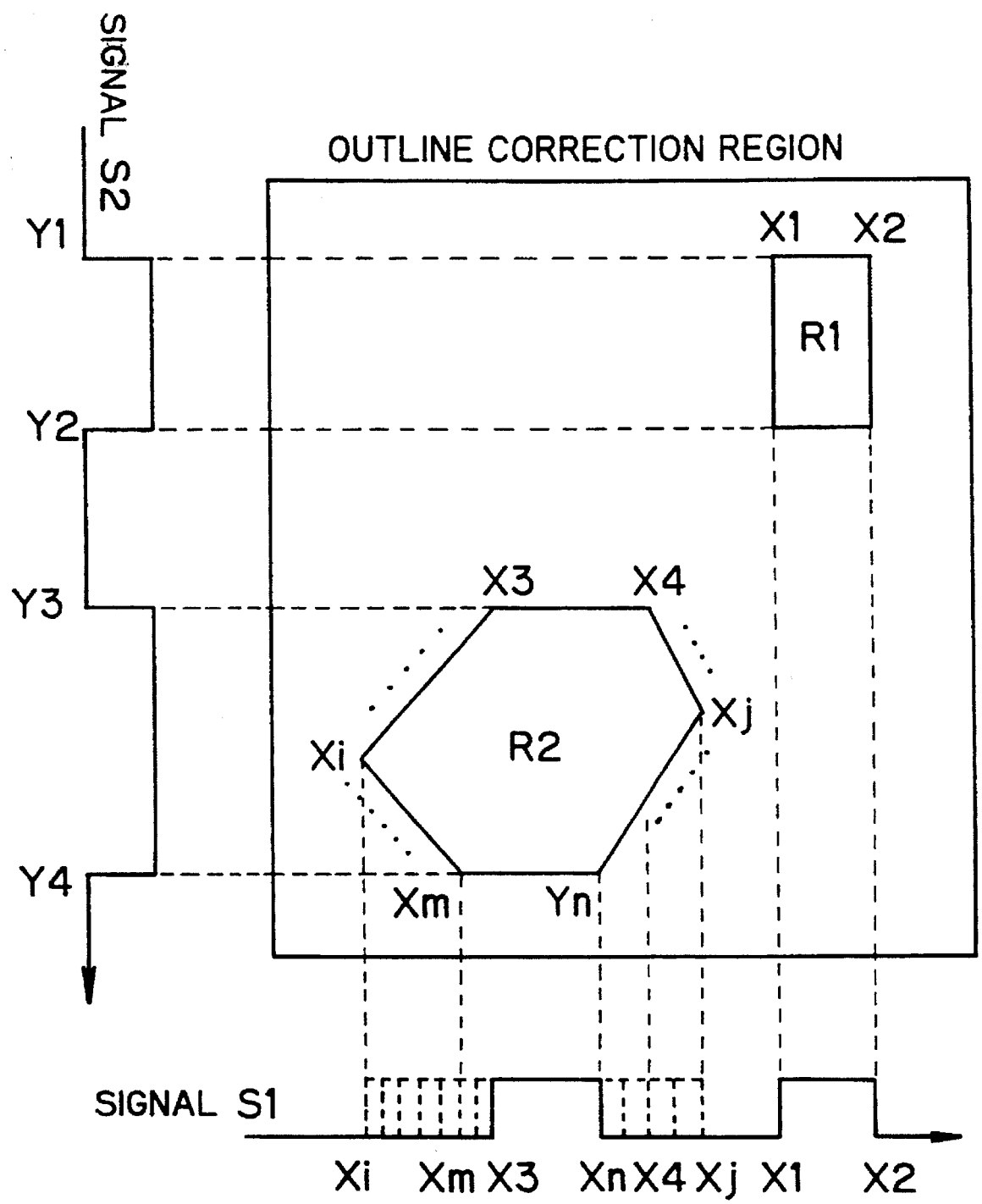
FIG. 7 is a diagram showing a third example of the transparent region formed by the embodiment.

FIG. 7 shows a case where a plurality of transparent regions R1 and R2 exist within the same page. As will clear from the foregoing description, for the transparent region R1, the X coordinates (X1, X2) are stored in the X coordinate stack Mxs for each raster line and Y coordinates (Y1, Y2) are stored in the Y coordinate stack Mys. For the transparent region R2, the X coordinates (X3, X4), . . . , and (Xm, Xn) are stored in the X coordinate stack Mxs, and the Y coordinates (Y3, Y4) are stored in the Y coordinate stack Mys. Therefore, for this printing page, (X1, X2), (X3, X4), . . . , and (Xm, Xn) are stored in the X coordinate stack Mxs, and (Y1, Y2) and (Y3, Y4) are stored in the Y coordinate stack Mys.

During the time the count value of the vertical-scanning synchronization pulse VC is between Y1 and Y2, the I/O controller 203 reads the X coordinates (X1, X2) for each raster line and stores them into the register 204. Next, if the count value of the vertical-scanning synchronization pulse VC becomes equal to Y3, the X coordinates (X3, X4) and the Y coordinates (Y3, Y4) will be read out and stored in the registers 204 and 205, respectively. And, until the count value of the vertical-scanning synchronization pulse VC reaches Y4, (X3, X4), . . . , and (Xm, Xn) are read in sequence from the X coordinate stack Mxs for each raster line, and the content of the register 204 is updated.

As has been described hereinbefore, in accordance with the present invention, an outline correction prohibition region, that is, a transparent region, of an arbitrary shape can be formed within the outline correction region of a printing image, and the above-described exposure modulation by the outline correction can be prevented to a scattering dot pattern such as a halftone image. Therefore, printing image data containing a binary image and a halftone image together can be printed with high picture quality.

While the subject invention has been described with relation to the preferred embodiment, various modifications and adaptations thereof will now be apparent to those skilled in the art. All such modifications and adaptations as fall within the scope of the appended claims are intended to be covered thereby.

What is claimed is:

1. An image formation system for forming binary image data by performing an outline correction on binary raster image data stored in an image memory, the binary raster image data including a gradation image region, the image formation system comprising:

transparent region setting means for setting the gradation image region as a transparent region in the binary raster image data;

read-position monitoring means for monitoring a read position of the binary raster image data read from the image memory;

decision means for deciding whether the read position of the binary raster image data falls within the transparent region or not; and control means for controlling the outline correction such that the outline correction is invalidated when the read position of the binary raster image data is decided to fall within the transparent region.

2. The image formation system as set forth in claim 1, wherein the transparent region set means comprises:

coordinate generation means for generating horizontal coordinate data indicative of start positions and end positions of the transparent region in a horizontal scanning direction and also vertical coordinate data indicative of start positions and end positions of the transparent region in a vertical scanning direction, based on outline coordinate data of the binary raster image data;

storage means for storing the horizontal coordinate data and the vertical coordinate data; and read control means for reading the horizontal coordinate data and the vertical coordinate data from the storage means in accordance with the read position of the binary raster image data in the vertical scanning direction.

3. The image formation system as set forth in claim 2, wherein the read-position monitoring means comprises:

horizontal-scanning coordinate generation means for generating horizontal read coordinate data in the horizontal scanning direction of the binary raster image data; and vertical-scanning coordinate generation means for generating vertical read coordinate data in the vertical scanning direction of the binary raster image data.

4. The image formation system as set forth in claim 3, wherein the decision means comprises:

first comparison means for comparing the horizontal coordinate data of the transparent region with the horizontal read coordinate data;

second comparison means for comparing the vertical coordinate data of the transparent region with the vertical read coordinate data; and coincidence detection means for performing a logical AND function on the comparison results of the first comparison means and the second comparison means.

5. The image formation system as set forth in claim 4, wherein the control means comprises:

outline-correction means for correcting the outline of the binary raster image data by modulating the binary raster image data in the horizontal scanning direction; and selection means for selecting one of the binary raster image data and the outline-corrected binary raster image data depending on whether the read position of the binary raster image data falls within the transparent region or not.

6. The image formation system as set forth in claim 1, wherein the read-position monitoring means comprises:

horizontal-scanning coordinate generation means for generating horizontal read coordinate data in a horizontal scanning direction of the binary raster image data; and vertical-scanning coordinate generation means for generating vertical read coordinate data in a vertical scanning direction of the binary raster image data.

7. The image formation system as set forth in claim 1, wherein the control means comprises:

outline-correction means for correcting the outline of the binary raster image data by modulating the binary raster image data in a horizontal scanning direction; and selection means for selecting one of the binary raster image data and the outline-corrected binary raster image data depending on whether the read position of the binary raster image data falls within the transparent region or not.

8. A method for forming binary image data by performing an outline correction on binary raster image data stored in an image memory, the binary raster image data including a gradation image region, the method comprising the steps of:

setting the gradation image region as a transparent region in the binary raster image data;

monitoring a read position of the binary raster image data read from the image memory;

deciding whether the read position of the binary raster image data falls within the transparent region or not; and controlling the outline correction such that the outline correction is invalidated when the read position of the binary raster image data is decided to fall within the transparent region.

9. The method as set forth in claim 8, wherein the step of setting the transparent region comprises the steps of:

generating horizontal coordinate data indicative of start positions and end positions of the transparent region in a horizontal scanning direction and also vertical coordinate data indicative of start positions and end positions of the transparent region in a vertical scanning direction, based on outline coordinate data of the binary raster image data;

storing the horizontal coordinate data and the vertical coordinate data; and reading the horizontal coordinate data and the vertical coordinate data from the storage means in accordance with the read position of the binary raster image data in the vertical scanning direction.

10. The method as set forth in claim 9, wherein the step of specifying the read-position comprises the steps of:

generating horizontal read coordinate data in the horizontal scanning direction of the binary raster image data; and generating vertical read coordinate data in the vertical scanning direction of the binary raster image data.

11. The method as set forth in claim 10, wherein the decision step comprises the steps of:

comparing, as a first comparison, the horizontal coordinate data of the transparent region with the horizontal read coordinate data;

comparing, as a second comparison, the vertical coordinate data of the transparent region with the vertical read coordinate data; and performing a logical AND function on the results of the first comparison and the second comparison.

12. The method as set forth in claim 11, wherein the control step comprises the steps of:

correcting the outline of the binary raster image data by modulating the binary raster image data in the horizontal scanning direction; and selecting one of the binary raster image data and the outline-corrected binary raster image data depending on whether the read position of the binary raster image data falls within the transparent region or not.

13. The method as set forth in claim 8, wherein the step of specifying the read-position comprises the steps of:

generating horizontal read coordinate data in a horizontal scanning direction of the binary raster image data; and generating vertical read coordinate data in a vertical scanning direction of the binary raster image data.

14. The method as set forth in claim 8, wherein the control step comprises the steps of:

correcting the outline of the binary raster image data by modulating the binary raster image data in a horizontal scanning direction; and selecting one of the binary raster image data and the outline-corrected binary raster image data depending on whether the read position of the binary raster image data falls within the transparent region or not.

* * * * *